Feb. 10, 1931.  D. R. YARNALL  1,791,610
SPRING COMPRESSED PACKING TRAIN
Filed April 19, 1928
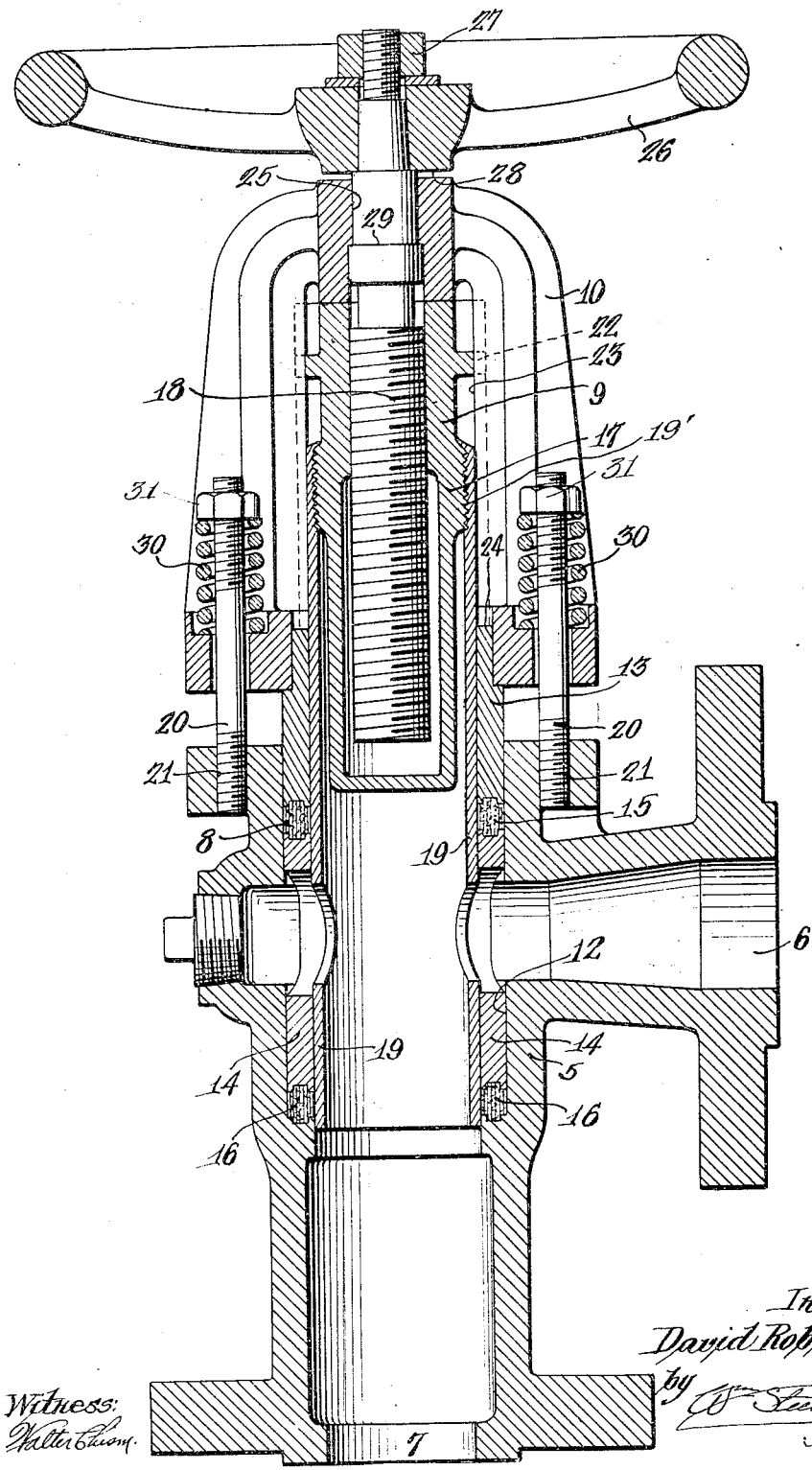

Patented Feb. 10, 1931

1,791,610

UNITED STATES PATENT OFFICE

DAVID ROBERT YARNALL, OF PHILADELPHIA, PENNSYLVANIA, ASSIGNOR TO YARNALL-WARING COMPANY, OF PHILADELPHIA, PENNSYLVANIA, A CORPORATION OF PENNSYLVANIA

SPRING-COMPRESSED PACKING TRAIN

Application filed April 19, 1928. Serial No. 271,184.

My invention relates to valves having yokes which are used to tighten valve packing. The invention finds its best illustration in seatless blow-off valves of this character.

One purpose of my invention is to hold a packing-compressing yoke to the body of a valve through springs located between the retaining means and the yoke so as resiliently to compress the valve packing.

A further purpose is to combine the resilient pressure of the yoke against the packing with valve-closure-tightened additional means for compressing the packing at the closing end of the valve plunger stroke.

A further purpose is to provide a resilient follow up for the packing of seatless valves.

Further purposes will appear in the specification and in the claims.

I have preferred to illustrate my invention by one embodiment only, selecting one which is practical, effective and highly desirable and which at the same time well illustrates the principles involved.

The figure shows a longitudinal section of a seatless blow-off valve to which my invention is applied.

In the drawing similar numerals indicate like parts.

My valve comprises a valve body 5 having any suitable inlet 6 and outlet 7, longitudinal bore 8 and plunger 9 operating in the bore and supported by a yoke or mount 10.

The body is counterbored at 12 to provide for lining shells 13 and 14, packing 15, held between the two lining shells 13 and 14 and packing 16 held between the lower shell and the bottom of the counterbore.

For convenience the plunger 9 is made in composite form. In the illustration a plug 17 is threaded to receive the operating screw 18 and the closure function is performed by an outer shell 19 threaded to the plug at 19'.

The yoke 10 is mounted upon the outer shell 13 so as to engage a shoulder on this shell, permitting the normal compression of the packing to be determined by the tightness of the bolts 20. The bolts are conveniently supplied as studs, threaded into the body at 21. The bolts hold the yoke upon the body of the valve.

The valve plug carries lugs 22 which are guided by fins 23 in the yoke so as to prevent the plug from turning. At the closing end of the valve stroke these lugs may engage an upper end 24 of the upper lining shell and press it downwardly, permitting the final movement of the valve plug to be used for the purpose of tightening the packings.

As thus far described this valve is a well known form of blow-off valve which has been placed on the market by the company with which applicant is associated. It is selected for illustration because it is the best form of valve known to applicant upon which to illustrate the invention, though applicant recognizes that various forms of valves other than this form would also offer good illustration of the invention.

The spindle 18 is rotatively mounted in the yoke at 25 and is turned by handle 26 secured in place by any suitable holding means as by nut 27 and is kept from longitudinal movement by the shoulders 28 and 29 which bear against the adjoining surface of the yoke.

The novelty in the present invention lies in mounting springs between the yoke (or whatever other member compresses the packing) and the body. Here the springs 30 are located between the bolts or studs 20 and the yoke so that the yoke is resiliently pressed downwardly permitting any predetermined constant resilient pressure without interfering with the subsequent follow up of the yoke by the lugs 22. This makes it possible to keep the packing tight at all times by pressure corresponding to the spring pressure.

Though the resilient follow-up for the packing is in itself very desirable, separately from the plunger operated final pressure, there is a considerable additional advantage in utilizing projections from the plunger—which may very conveniently be these lugs 22 as in the old form of valve—in such position that, when the plunger is at the extreme closing end of its stroke the projections engage and additionally press the lining shell to tighten the packing.

As the final pressure of the projections against the shell reacts upon the springs through the yoke, this final pressure upon the packings is also resilient.

The resilient pressure will be determined primarily by the selection of length, diameter of wire, diameter of coil, material and temper of the springs but can be varied somewhat by tightening or loosening the nuts 31 upon the studs.

The springs need not be long; with small sized valves I have secured good results even using spring washers as the springs.

Having thus described my invention, what I claim as new and desire to secure by Letters Patent is:—

1. A seatless blow-off valve having a body, a longitudinally movable plunger, packing surrounding the plunger, a mount for the plunger and resilient connections between the mount and the body of the valve whereby the resilient connections exert pressure upon the mount to compress the packing surrounding the plunger.

2. A seatless blow-off valve having a body, a longitudinally movable plunger and packing surrounding the plunger, means for compressing the packing adapted to be moved longitudinally of the body and extending outside of the body, a mount for the plunger supported upon the compressing means, operating means for the plunger carried by said mount moving it within the mount and a resilient connection between the valve body and the mount tending to press the mount toward packing compression.

3. A seatless blow-off valve having a longitudinally movable plunger and packing surrounding the plunger, spring-pressed tightening means for the packing and plunger-operated additional tightening means for increasing the spring pressure upon the packing at the closing end of the stroke.

4. A valve body, a lining shell in the body, packing in the body adapted to be tightened by longitudinal movement of the shell, a valve yoke mounted upon the lining shell so that tightening of the yoke tightens the shell against the packing, fastening means for holding the yoke to the body, springs interposed between the fastening means and the yoke to resiliently press the yoke toward the body, a valve plunger and means for operating the plunger within the lining shell and the packing.

5. A valve body, lining shells in the body, packing in the body adapted to be tightened by longitudinal movement of the shells, a valve yoke mounted upon one of the lining shells so that tightening of the yoke tightens the shells against the packing, fastening means for holding the yoke to the body, springs interposed between the fastening means and the yoke to resiliently press the yoke toward the body, a valve plunger, plunger-carried means engaging the shell on which said yoke is mounted and tightening the packing at the closing extremity of the plunger movement and means for operating the plunger within the lining shells and packing.

6. A valve body, inner and outer lining shells in the body, packing in the body adapted to be tightened by longitudinal movement of the shells, a valve yoke mounted upon one of the lining shells so that tightening of the yoke tightens the shell against the packing, fastening means for holding the yoke to the body, springs interposed between the fastening means and the yoke to resiliently press the yoke toward the body, a valve plunger, projections carried by the plunger extending beyond the normal plunger width and at the closed position of the valve adapted to engage the outer lining shell and force it more tightly against the packing and operating means for the plunger to move the plunger through the lining shells and packing.

7. A valve body, inner and outer lining shells in the body, packing in the body adapted to be tightened by longitudinal movement of the shells, a valve yoke mounted upon one of the lining shells so that tightening of the yoke tightens the shells against the packing, fastening means for holding the yoke to the body, springs interposed between the fastening means and the yoke to resiliently press the yoke toward the body, a valve plunger, guide projections carried by the plunger coacting with the yoke to prevent turning of the plunger and in the closed position of the valve engaging the outer lining shell to tighten the lining shells against the packing and operating means for moving the plunger through the shells and packing.

8. A valve body having side inlet and end outlet, bored to provide for lining shells and packing, packing in the lower part of the bore below the inlet, a lower lining shell resting upon the packing below the valve inlet, a second packing resting upon the lower lining shell and above the inlet opening, a second lining shell resting upon the second packing, a yoke mounted upon the second lining shell, bolts secured in the valve body and passing above a portion of the yoke, springs between the bolts and the adjacent portion of the yoke, a longitudinally movable plunger, movable past the packing and operating means for moving the plunger.

9. A valve body having side inlet and end outlet, bored to provide for lining shells and packing, packing in the lower part of the bore below the inlet, a lower lining shell resting upon the packing below the valve inlet, a second packing resting upon the lower lining shell and above the inlet opening, a second lining shell resting upon the second packing, a yoke mounted upon the second lining shell, bolts secured in the valve body and passing above a portion of the yoke, springs between the bolts and the adjacent portion of the yoke, a longitudinally movable plunger for the valve, operating means for moving the plunger and plunger-carried tightening means engaging the outer lining shell in the closed position of the valve to tighten both lining shells against the packing.

DAVID ROBERT YARNALL.